(12) United States Patent
Nakabayashi (10) Patent No.: US 7,847,965 B2
(45) Date of Patent: Dec. 7, 2010

(54) IMAGE FORMING APPARATUS AND CONFIDENTIAL DATA TRANSMITTING METHOD

(75) Inventor: Makoto Nakabayashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1211 days.

(21) Appl. No.: 11/453,765

(22) Filed: Jun. 14, 2006

(65) Prior Publication Data

US 2007/0002390 A1   Jan. 4, 2007

(30) Foreign Application Priority Data

Jun. 30, 2005   (JP)   ............................. 2005-191798

(51) Int. Cl.
*G06F 3/12* (2006.01)

(52) U.S. Cl. ...................... 358/1.15; 358/401; 358/402; 358/400; 379/100.06

(58) Field of Classification Search ................ 358/400, 358/403, 1.15, 497, 496, 405, 426.03, 426.04, 358/468, 402; 379/100.01, 100.06, 206; 382/305

See application file for complete search history.

(56) References Cited

U.S. PATENT DOCUMENTS

| | | | | | |
|---|---|---|---|---|---|
| 4,900,902 | A | * | 2/1990 | Sakakibara | ................... 235/375 |
| 4,975,783 | A | * | 12/1990 | Takaoka | ..................... 358/404 |
| 5,103,318 | A | * | 4/1992 | Takaoka | ..................... 358/404 |
| 5,255,106 | A | * | 10/1993 | Castro | ........................ 358/400 |
| 5,353,388 | A | * | 10/1994 | Motoyama | .................. 358/1.18 |
| 5,404,231 | A | * | 4/1995 | Bloomfield | ................. 358/400 |
| 5,535,277 | A | * | 7/1996 | Shibata et al. | ................ 380/28 |
| 5,692,048 | A | * | 11/1997 | Gormish et al. | ............. 380/246 |
| 5,737,454 | A | * | 4/1998 | Park et al. | ................... 382/284 |
| 6,014,228 | A | * | 1/2000 | Castro | ........................ 358/400 |
| 6,055,067 | A | * | 4/2000 | Matsuda et al. | ............. 358/468 |
| 6,108,103 | A | * | 8/2000 | Kurozasa | ..................... 358/405 |
| 6,266,159 | B1 | * | 7/2001 | Otsuka et al. | ................ 358/405 |
| 6,442,252 | B1 | * | 8/2002 | Fujise et al. | ........... 379/100.01 |
| 7,421,496 | B2 | * | 9/2008 | Motoyama | ................... 709/224 |
| 7,567,355 | B2 | * | 7/2009 | Matsunoshita | ............. 358/1.13 |

(Continued)

FOREIGN PATENT DOCUMENTS

JP   02-094836   5/1990

(Continued)

*Primary Examiner*—Negussie Worku
(74) *Attorney, Agent, or Firm*—Edwards Angell Palmer & Dodge LLP; David G. Conlin; William J. Daley, Jr.

(57) ABSTRACT

The calling image forming apparatus includes an image processing unit that encodes read image data, a communication controlling unit and modem that performs facsimile transmission for each page of encoded data that has been encoded, and an image memory that stores confidential data, which are data that should be confidential for the communication counterpart (callee). When the facsimile transmission is performed for each page of the encoded data, the image forming apparatus notifies the counterpart image forming apparatus that the confidential data are added and transmitted at the end of the page and performs the facsimile transmission of the confidential data added to the end of the page when a notification of transmission permission is received from the image forming apparatus.

17 Claims, 11 Drawing Sheets

U.S. PATENT DOCUMENTS

| | | | |
|---|---|---|---|
| 2002/0004812 A1* | 1/2002 | Motoyama | 709/201 |
| 2002/0097434 A1* | 7/2002 | Tsukioka | 358/1.16 |
| 2003/0179399 A1* | 9/2003 | Matsunoshita | 358/1.13 |
| 2005/0200906 A1* | 9/2005 | Tanimoto | 358/400 |
| 2006/0101125 A1* | 5/2006 | Motoyama | 709/206 |
| 2006/0139698 A1* | 6/2006 | Kowada et al. | 358/437 |

FOREIGN PATENT DOCUMENTS

| | | |
|---|---|---|
| JP | 05-041808 | 2/1993 |
| JP | 11-298740 | 10/1999 |

* cited by examiner

DIVIDE AND TRANSMIT

IMAGE FORMING APPARATUS AND CONFIDENTIAL DATA TRANSMITTING METHOD

CROSS-NOTING PARAGRAPH

This non-provisional application claims priority under 35 U.S.C. §119(a) on Patent Application No. 2005-191798 filed in JAPAN on Jun. 30, 2005, the entire contents of which are hereby incorporated herein by reference.

FIELD OF THE INVENTION

The present invention relates to an image forming apparatus with a function that performs facsimile transmission using public network and a confidential data transmitting method of the image forming apparatus.

BACKGROUND OF THE INVENTION

Conventionally, various propositions have been made for technology for compressing and encoding image information and, for example, Japanese Laid-Open Patent Publication No. H05-41808 discloses a technology for compressing and encoding bitmap data output from a scanner in a facsimile apparatus, etc. In this technology, the bitmap data output from the scanner are converted to run-length data and stored via FIFO memory to a DRAM buffer and, based on the control from CPU, the run-length data are sequentially read from the DRAM buffer, converted to compressed/encoded data such as MH (Modified Huffman code), MR (Modified Read code), MMR (Modified Modified Read), etc., and sequentially stored into the DRAM buffer. The compressed/encoded data stored in the DRAM buffer are output to the outside via SCSI I/F.

In the encoding mode of the MH, MR, and MMR codes, etc. generated from the run-length data, when a process for one line is completed in one page of data, an EOL (End Of Line) code is added as an end-of-line code, and when a process for one page is completed, an RTC (Return To Control) code is added as a return-to-control signal indicating that transmission of one page of data is terminated to return to control, and the data process is terminated. The RTC code is constituted by six consecutive EOL codes, for example. This data processing mode is defined in ITU (International Telecommunication Union) recommendations that establish facsimile data encoding mode, and a subsequent portion of the RTC code is normally treated as noises and is not decoded.

On the other hand, various encoding/decoding technologies are proposed for confidential communication in facsimile apparatuses. For example, in the disclosure of Japanese Laid-Open Patent Publication No. H02-94836, a confidential apparatus is disposed between own-station and opposite-station communication apparatuses connected to each other via a communication line and confidential communication can be achieved with this confidential apparatus without altering the conventional communication apparatuses. The confidential apparatus is disposed between each facsimile apparatus and switching equipment, and includes two modems, a control apparatus, and a unit with a function for encrypting and decrypting signals. When confidential communication is performed: on the transmitting side, image information sent by one facsimile apparatus over the line is input through the modem; the encrypted information is sent through another modem over the line; on the receiving side, the encrypted information sent from the transmitting side over the line is input through the modem and decrypted to reproduce the image information; and the reproduced image information is sent to the other facsimile apparatus through another modem.

However, in the invention described in the Japanese Laid-Open Patent Publication No. H02-94836, the confidential apparatus must be additionally disposed between the facsimile apparatus and the switching equipment, and the confidential communication cannot be used easily because of problems of the installation cost and installation location of the confidential apparatus. Therefore, it is desired to use the confidential communication in a more simplified configuration.

As described in Japanese Laid-Open Patent Publication No. H05-41808, since a subsequent portion of the RTC code added to the end of the one-page image data is normally treated as noises, data are not added to this portion in general, and even if data are added, the data are not decoded on the receiving side and are not utilized in data communication.

Therefore, if a protocol between the facsimile apparatuses is set so as to add and transmit/receive data that should be confidential after the RTC code and if the presence of the confidential data is recognized only between a certain caller and callee establishing this protocol, it is thought that the confidential communication can be achieved easily without disposing special equipment on the facsimile apparatus as is the case of Japanese Laid-Open Patent Publication No. H02-94836. This is not achieved in the aforementioned prior arts.

SUMMARY OF THE INVENTION

The object of the present invention is to provide an image forming apparatus wherein a protocol between the image forming apparatuses is set so as to add and transmit/receive data that should be confidential at the end of one page of image data, and confidential communication can be performed only between certain caller and callee establishing this protocol.

Another object of the present invention is to provide an image forming apparatus with a function of performing facsimile transmission comprising an encoding unit that encodes input image data; a facsimile transmitting unit that performs facsimile transmission for each page of the encoded data that has been encoded; and a confidential data acquiring unit that acquires confidential data, which are data that should be confidential between a communication partner, wherein when the facsimile transmission is performed for each page of the encoded data, the confidential data are added and transmitted at the end of the page.

Another object of the present invention is to provide an image forming apparatus, wherein the other image forming apparatus of the communication partner may be notified that the confidential data are added and transmitted at the end of the page and the facsimile transmission may be started when notification of transmission permission is received from the other image forming apparatus.

Another object of the present invention is to provide an image forming apparatus, wherein one page of the encoded data may be constituted by a plurality of lines and the facsimile transmission may be performed by adding an end code indicating the end of the page after the final line of the one page of the encoded data and by adding the confidential data after the end code.

Another object of the present invention is to provide an image forming apparatus, wherein the confidential data may be divided into a plurality of portions and the facsimile transmission may be performed by adding each portion of the confidential data sequentially after the end code added to the end of each page of the encoded data.

Another object of the present invention is to provide an image forming apparatus, wherein the confidential data may be any one page of the encoded data, which is divided into a plurality of portions, and the facsimile transmission may be performed by adding each portion of the confidential data sequentially after the end code added to the end of each page of the encoded data.

Another object of the present invention is to provide an image forming apparatus, wherein the confidential data may be encrypted and divided into a plurality of portions and the facsimile transmission may be performed by including an encryption key for decrypting the confidential data in any page when adding and transmitting each portion of the confidential data sequentially after the end code added to the end of each page of the encoded data.

Another object of the present invention is to provide an image forming apparatus, wherein the each page of the encoded data may be data by encoding different image data.

Another object of the present invention is to provide an image forming apparatus, wherein the each page of the encoded data may be data by dividing one piece of image data into a plurality of data and encoding the data.

Another object of the present invention is to provide an image forming apparatus, wherein at least one page of the each page of the encoded data may be dummy data.

Another object of the present invention is to provide a confidential data transmitting method of an image forming apparatus with a function of performing facsimile transmission comprising the steps of encoding input image data; acquiring confidential data, which are data that should be confidential between a communication partner; and, when the facsimile transmission is performed for each page of encoded data that are the encoded image data, adding and transmitting the confidential data at the end of the page.

Another object of the present invention is to provide a confidential data transmitting method, wherein the other image forming apparatus of the communication partner may be notified that the confidential data are added and transmitted at the end of the page and the facsimile transmission may be started when notification of transmission permission is received from the other image forming apparatus.

Another object of the present invention is to provide a confidential data transmitting method, wherein one page of the encoded data may be constituted by a plurality of lines and the facsimile transmission may be performed by adding an end code indicating the end of the page after the final line of the one page of the encoded data and by adding the confidential data after the end code.

PREFERRED EMBODIMENTS OF THE INVENTION

Figure 1:
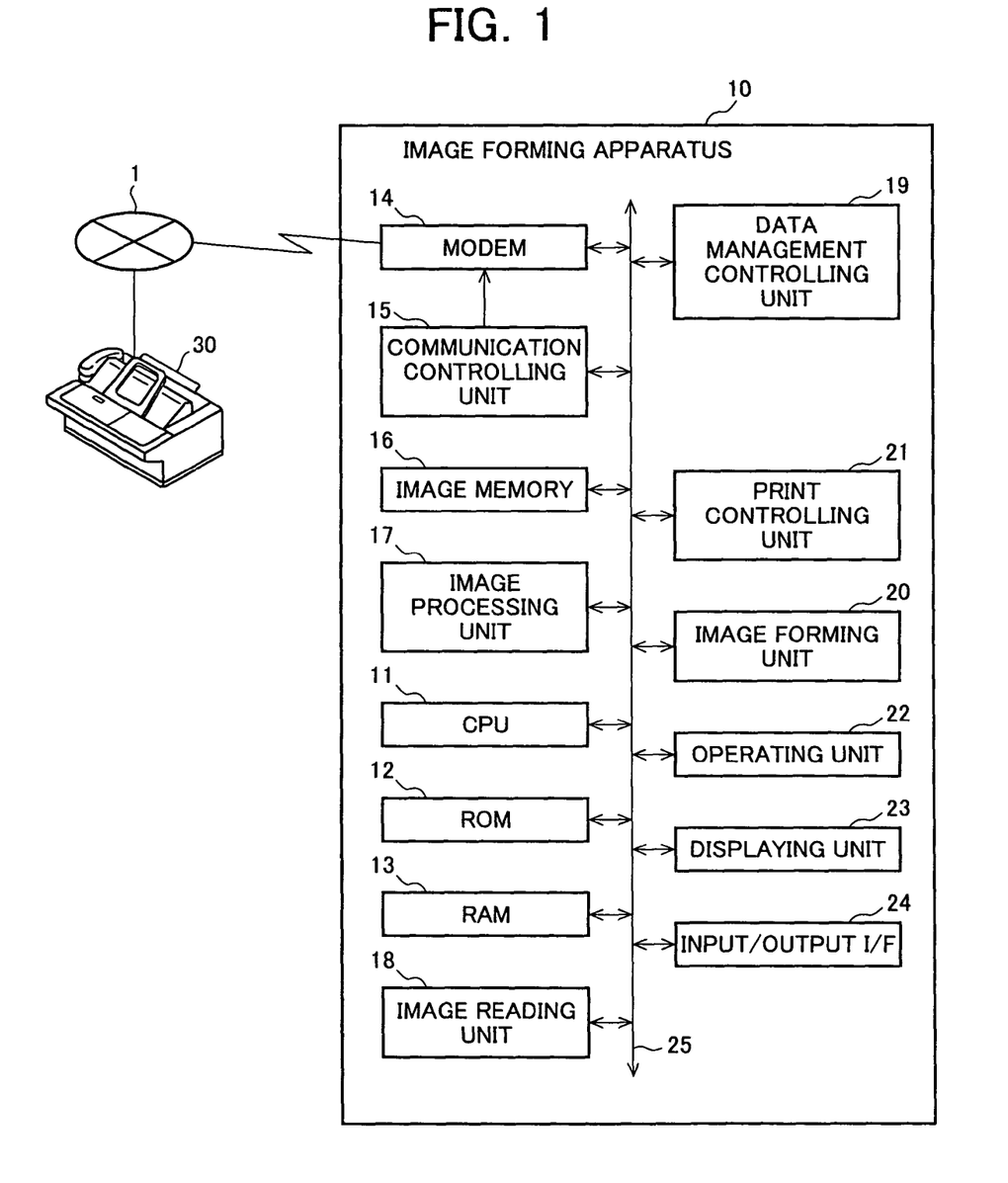
FIG. 1. is a block diagram of a configuration example of an image forming apparatus according to one embodiment of the present invention.

FIG. 1 is a block diagram of a configuration example of an image forming apparatus according to one embodiment of the present invention; in FIG. 1, a numeral 10 is an image forming apparatus; and the image forming apparatus 10 is constituted by a CPU 11 that controls operation of each unit of the image forming apparatus 10, a ROM 12 that stores a control program, various data, etc., a RAM 13 that is a work area, a modem 14 that is modulating/demodulating means (corresponding to a facsimile transmitting unit of the present invention) for facsimile transmission/reception of encoded image data, a communication controlling unit 15 that controls the facsimile transmission/reception of the modem 14; an image memory 16 that stores image data, confidential data, etc, an image processing unit 17 that corresponds to an encoding unit of the present invention for encoding/decoding image data, an image reading unit 18 that reads image of a document, a data management controlling unit 19 that manages a protocol for data processing between the facsimile apparatuses, an image forming unit 20 for printing and outputting the image data; a print controlling unit 21 that controls the image forming unit 20; an operating unit 22 that accepts various user inputs, a displaying unit 23 such as LCD (Liquid Crystal Display) that displays various pieces of information; an input/output interface (input/output I/F) 24 for connecting with a recording medium such as a memory card, and a system bus 25 for connecting the above units with each other.

The image forming apparatus 10 of the present invention may be a facsimile apparatus with a facsimile transmission function or may be a digital composite machine with a plurality of functions such as a facsimile function, copy function, printer function, scanner function, etc. Description will hereinafter be made of a representative example when the image forming apparatus 10 is applied to a facsimile apparatus (hereinafter, facsimile apparatus 10).

In FIG. 1, the facsimile apparatus 10 is connected to a facsimile apparatus 30 that is a counterpart image forming apparatus via network 1 such as public network and can perform facsimile transmission/reception with each other. The facsimile apparatus 10 can be connected to an information processing apparatus such as a personal computer (hereinafter, PC) via network, etc. and can acquire and store image data from the information processing apparatus into the image memory 16.

Description will be made of the case of the facsimile transmission from the facsimile apparatus 10 (caller) to the facsimile apparatus 30 (callee). The facsimile apparatus 10 optically reads a document set at a predetermined read position and temporarily stores the read image data into the image memory 16. The image data stored in the image memory 16 are sequentially sent to the image processing unit 17 and are encoded in accordance with a predetermined encoding mode in the image processing unit 17. This encoding mode may be any one of MH mode, MR mode, and MMR mode, for example. When a process of one line is completed in one page of the encoded data, an EOL (End Of Line) code is added as an end-of-line code by the image processing unit 17, and when a process of N-lines, i.e., a process of one page is completed, an RTC (Return To Control) code is added as a return-to-control signal indicating that transmission of one page of data is terminated to return to control, and the data process is terminated. This RTC code corresponds to an end code of the present invention indicating the end of page and is constituted by six consecutive EOL codes, for example.

When the transmission process of one page of the encoded data is performed, the image processing unit 17 adds the RTC code after the final line (i.e., the Nth line) and transmits the data from the modem 14 to the called facsimile apparatus 30. The called facsimile apparatus 30 receives the encoded data transmitted from the calling facsimile apparatus 10 and decodes the received encoded data to print and output the original image data. By detecting the RTC code, one page of the encoded data can be recognized.

The facsimile apparatus 10 acquires confidential data, i.e., data that should be confidential between the facsimile apparatuses 10 and 30. In the acquiring method of the confidential data, for example, the confidential data may be acquired by reading a confidential document with the image reading unit 18 or may be acquired through the input/output I/F 24 from the connected PC or recording medium such as a memory card. The image reading unit 18 and the input/output I/F 24 correspond to a confidential data acquiring unit of the present invention. The acquired confidential data may be stored in the image memory 16. The confidential data may or may not be encrypted.

When the facsimile apparatus 10 of the present invention performs facsimile transmission of the encoded data for each page, the facsimile apparatus 10 adds and transmits the confidential data at the end of the page, i.e., after the RTC code. The confidential data transmission process is performed by the data management controlling unit 19, the image processing unit 17, the communication controlling unit 15, and the modem 14.

In preprocessing of the facsimile transmission, a process is performed to notify the facsimile apparatus 30 that the confidential data are added and transmitted at the end of the page, and the facsimile transmission is started when notification of transmission permission is received from the facsimile apparatus 30. That is, since the confidential data transmission process is performed only when a protocol is established between the calling facsimile apparatus 10 and the called facsimile apparatus 30, the confidential data portion is recognized as noises by other facsimile apparatuses not establishing the protocol and the leakage of the confidential data can be prevented. The protocol establishing process is performed by the data management controlling unit 19, the communication controlling unit 15, and the modem 14.

In this way, by setting a protocol in advance between the facsimile apparatuses such that the confidential data can be added and transmitted/received at the end of one page of the encoded data, the confidential communication can be easily realized between certain facsimile apparatuses (e.g., facsimile apparatuses of the same manufacturer).

Figure 2:
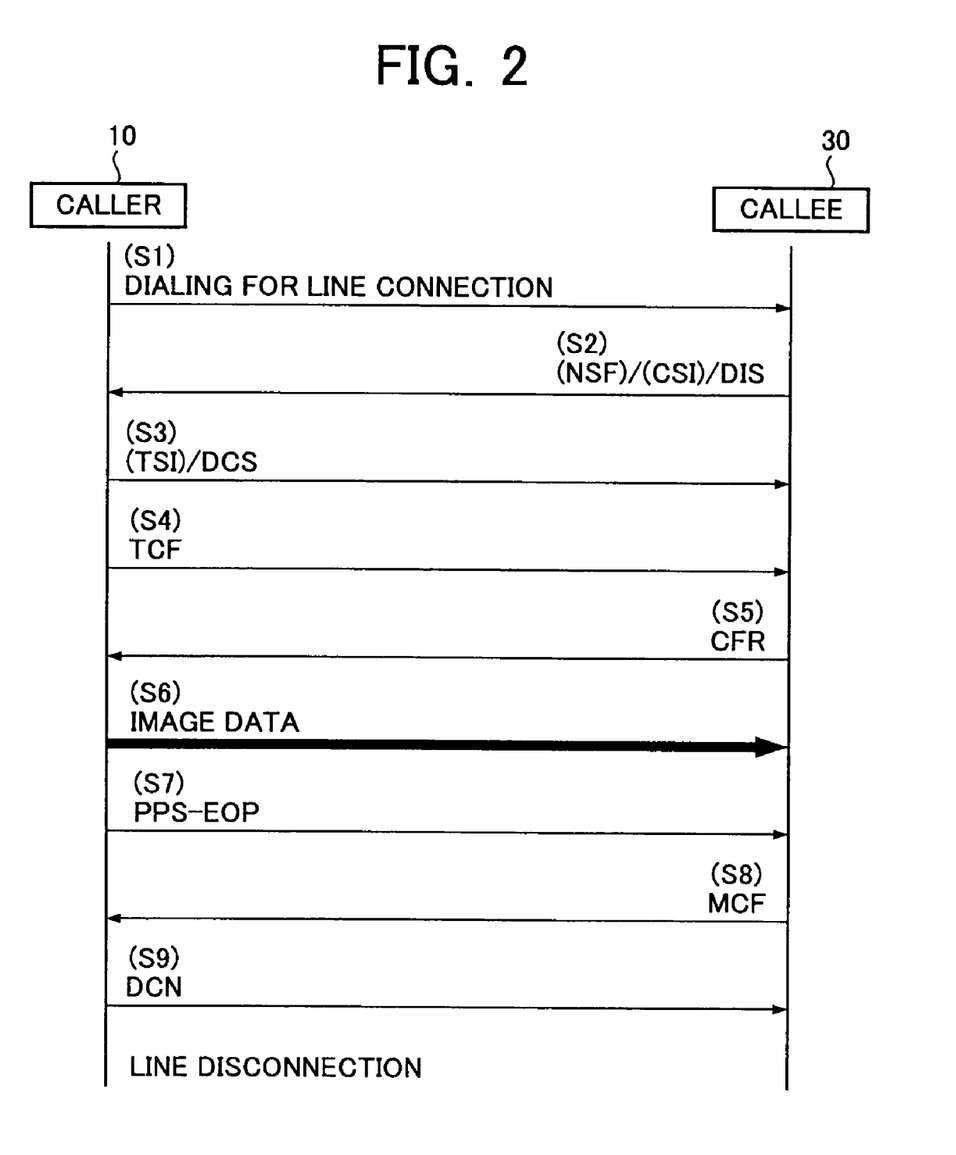
FIG. 2 is a diagram for describing a procedure when one page of image data is transmitted from a calling facsimile apparatus to a called facsimile apparatus.

FIG. 2 is a diagram for describing a procedure when one page of image data is transmitted from a calling facsimile apparatus to a called facsimile apparatus. In FIG. 2, NSF is a non-standard facilities; CSI is a called subscriber identification; DIS is a digital identification signal; TSI is a transmitting subscriber identification; DCS is a digital command signal; TCF is a training check; CFR is a confirmation to receive; PPS-EOP is a partial page signal—end of procedure; MCF is a message confirmation; and DCN is a disconnect. Functions and formats of these signals are defined in ITU recommendations.

First, the calling facsimile apparatus 10 (hereinafter, caller 10) performs dialing for line connection with the called facsimile apparatus 30 (hereinafter, callee 30) (S1); the callee 30 transmits NSF (non-standard facilities), CSI (called subscriber identification), and DIS (digital identification signal) to the caller 10 (S2); the caller 10 transmits TSI (transmitting subscriber identification) and DCS (digital command signal) (S3) and transmits TCF (training check) to the callee 30 (S4); and the callee 30 transmits CFR (confirmation to receive) to the caller 10 (S5). When the protocol is established between the caller 10 and the callee 30 in this way, the caller 10 transmits image data with confidential data added (S6) and transmits PPS-EOP (partial page signal—end of procedure) to the callee 30 (S7). The callee 30 transmits MCF (message confirmation) to the caller 10 (S8) and the caller 10 transmits DCN (disconnect) to the callee 30 (S9).

Figure 3:
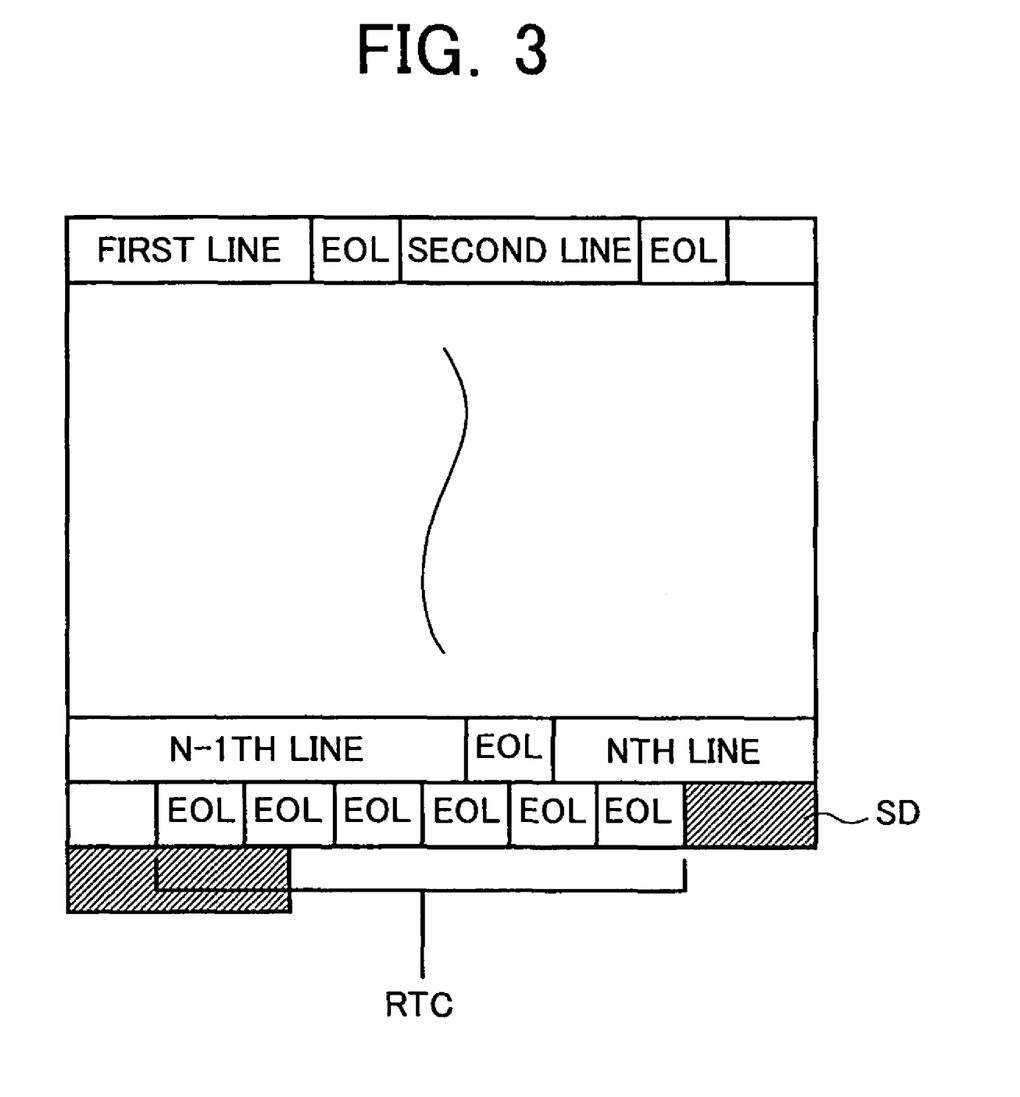
FIG. 3 shows a configuration example of one page of encoded data according to the present invention.

FIG. 3 shows a configuration example of one page of the encoded data according to the present invention, and in FIG. 3, EOL is an end-of-line code indicating the end of a line; RTC is a return-to-control code (an end code indicating the end of a page of the present invention); and SD (shaded area) is the confidential data. One page of the encoded data is constituted by a plurality of lines (N-lines in this example). The calling facsimile apparatus 10 adds one EOL when a process of a first line is completed and repeats the same process of adding one EOL for each line until a process of an N-1th line is completed. When the process of the final Nth line is completed, six EOLs are consecutively transmitted as RTC. Although the process of the image data is completed at this point of time, the confidential data SD are added and transmitted after RTC in the present invention.

Figure 8:
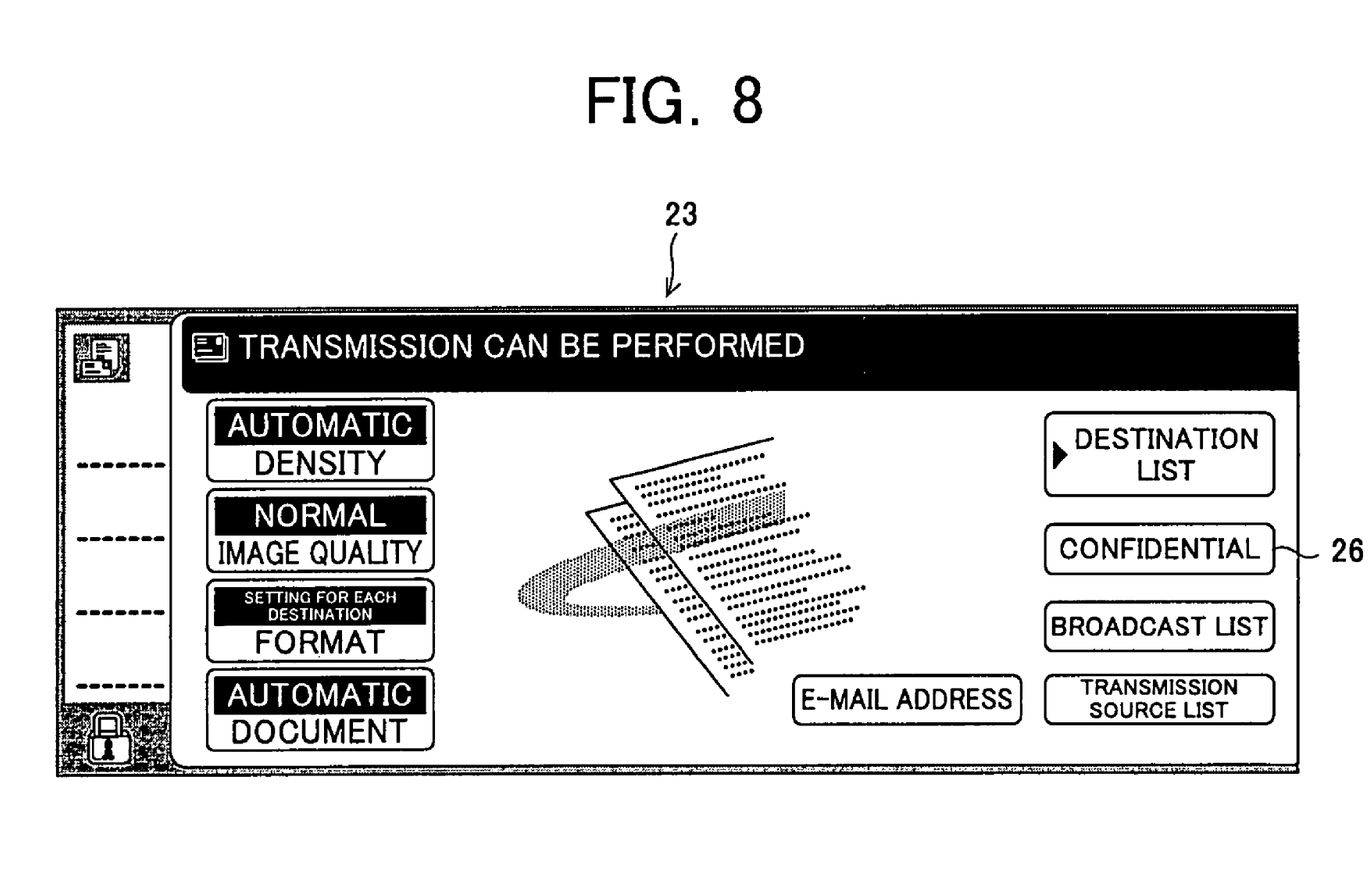
FIG. 8 shows an example of a confidential transmission selection screen displayed on the displaying unit.

Since the called facsimile apparatus 30 recognizes that the confidential data has been added to and transmitted with the image data, the called facsimile apparatus 30 performs an output process such as printing of the received confidential data. Whether the confidential data are added and transmitted may be set in advance in the initial setting of the facsimile apparatuses. For example, as shown in FIG. 8 described later, "confidential" is specified at the displaying unit 23 of the calling facsimile apparatus 10. This "confidential" specification information is transmitted to the called facsimile apparatus 30 when establishing the protocol to notify that the confidential communication is performed, and if the callee supports the confidential communication, the callee recognizes that the confidential data are transmitted from the caller.

Figure 4:
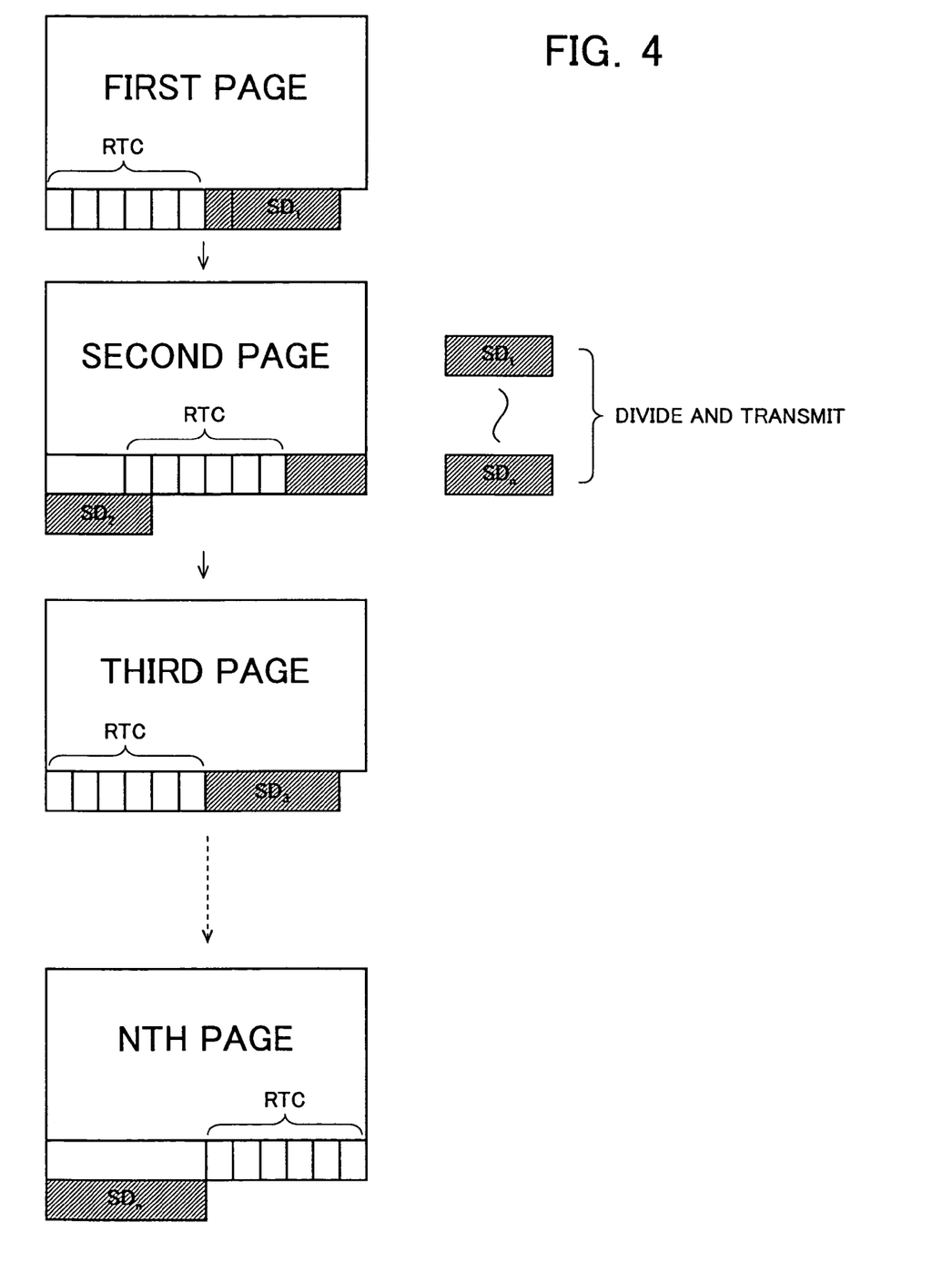
FIG. 4 shows a configuration example of encoded data for a plurality of pages according to the present invention.

FIG. 4 shows a configuration example of the encoded data of a plurality of pages according to the present invention. In this example, the confidential data are divided into a plurality of portions ($SD_1$ to $SD_n$). The encoded data (image data) for adding the confidential data are constituted by a plurality of pages (first page to Nth page). The facsimile apparatus 10 sequentially adds and transmits each of the divided confidential data $SD_1$ to $SD_n$ after RTC added to the image data of each page. That is, the confidential data $SD_1$ are added to and transmitted with the image data for the first page and, similarly, the confidential data $SD_n$ are added to and transmitted with the image data for the Nth page.

With regard to the image data for adding the confidential data, the first page to the Nth page may be different image data, or one page of image data may be divided into the first page to the Nth page of the image data. Alternatively, the image data may be dummy data. In this case, all the pages from the first page to the Nth page may be dummy data, or any page (e.g., N-1th page, Nth page) may be dummy data among the first page to the Nth page, and at least one page of the data for adding the confidential data can be dummy data. If dummy data are used, desired data may be stored in advance in the image memory 16. The dummy data may be any data, for example, a blank page (empty data), image data with contents irrelevant to a communication counterpart, etc.

As described above, for example, the image data for adding the confidential data may be read from a document that must be sent to a communication counterpart or acquired from a recording medium such as a memory card. The image data may be dummy data that is not actually necessary for a communication counterpart.

Figure 5:
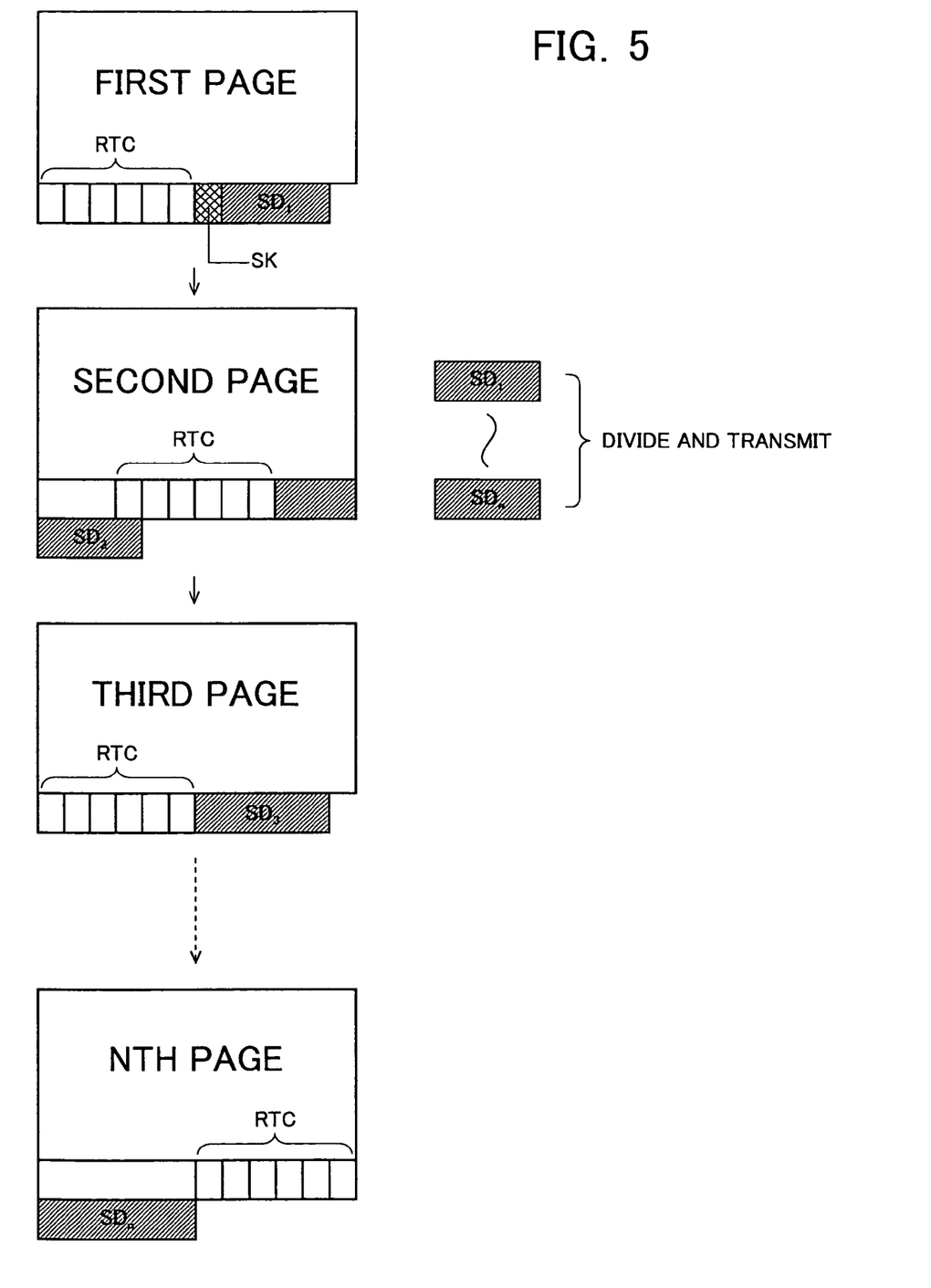
FIG. 5 shows another configuration example of encoded data of a plurality of pages according to the present invention.

FIG. 5 shows another configuration example of the encoded data of a plurality of pages according to the present invention. In this example, the confidential data are encrypted and divided into a plurality of portions ($SD_1$ to $SD_n$), and SK is an encryption key for decrypting the confidential data $SD_1$ to $SD_n$. The encoded data (image data) for adding the confidential data are constituted by a plurality of pages (first page to Nth page). With regard to this image data, as is the case with FIG. 4, the first page to the Nth page may be different image data; one page of image data may be divided into the first page to the Nth page of the image data; or the image data may be dummy data.

A known private key encryption mode or public key encryption mode may be applied to the encryption/decryption mode using the encryption key SK. Although the same key is used for encryption and decryption in the private key encryption mode, the public key encryption mode is an encryption mode using two keys making a pair for encryption/decryption and is also referred to as an asymmetric encryption mode. One key is widely released to others and is referred to as a public key, and the other key is strictly managed so as to be recognized only by a relevant person and is referred to as a private key. Since data encrypted by the private key can be decrypted only by the corresponding public key and data encrypted by the public key can be decrypted only by the corresponding private key, as compared to the private key encryption mode using the same key for encryption and decryption, the public key encryption mode is more secure in the management of the key because the key does not have to be transported through a secure path.

In this example, the facsimile apparatus 10 sequentially adds and transmits each of the divided confidential data $SD_1$ to $SD_n$ after RTC added to the image data of each page. That is, the confidential data $SD_1$ are added to and transmitted with the image data for the first page and, similarly, the confidential data $SD_n$ are added to and transmitted with the image data for the Nth page. The encryption key SK is included in and transmitted with any page (first page in this example). Only the encryption key SK may be added to and transmitted with the first page and each of the confidential data $SD_1$ to $SD_n$ may be sequentially added to and transmitted with the second page or later. In this case, although the (Nth) page for adding the final confidential data $SD_n$ may run short, this can be accommodated by using dummy data for the final Nth page. Only the encryption key SK may be transmitted separately to the communication counterpart by an e-mail, etc., and each of the confidential data $SD_1$ to $SD_n$ may be sequentially added to and transmitted with the first page to the Nth page.

Figure 6:
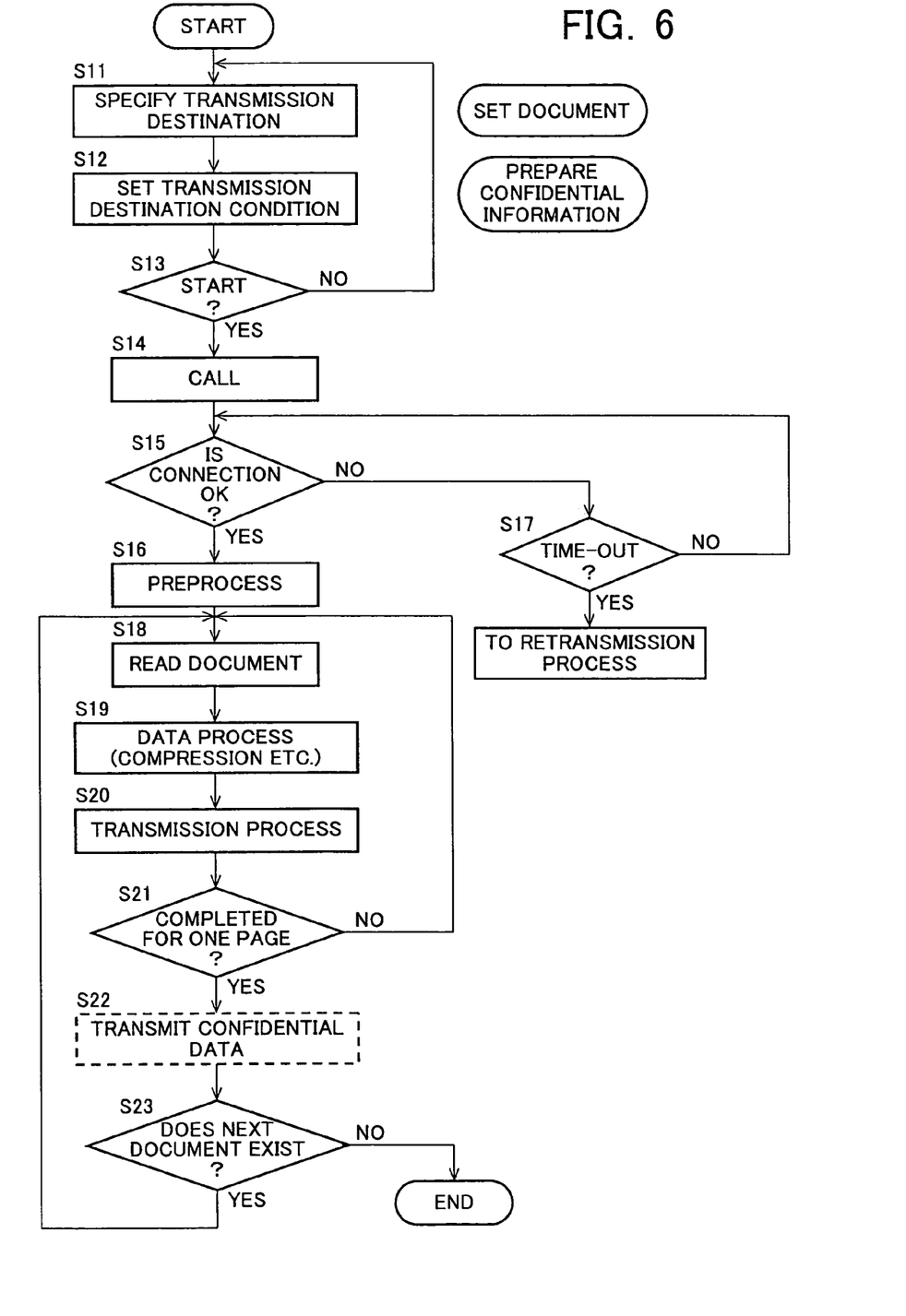
FIG. 6 is a flowchart for describing an example of a confidential data transmitting method to which the present invention is applied.

FIG. 6 is a flowchart for describing an example of a confidential data transmitting method to which the present invention is applied. This example will be described based on the facsimile apparatus 10 (caller) and the facsimile apparatus 30 (callee). First, a user sets a document at a predetermined read position of the facsimile apparatus 10, specifies the transmission destination of the document from the operating unit 22 and the displaying unit 23 (step S11), and sets a transmission destination condition from the operating unit 22 and the displaying unit 23 (step S12). Confidential information added to the image data is stored in the image memory 16.

The facsimile apparatus 10 determines whether a facsimile transmission start button is pressed by the user or not (step S13), and if it is determined that the start button is pressed (case of YES), the facsimile apparatus 10 calls the called facsimile apparatus 30 (step S14). If it is determined that the start button is not pressed at step S13 (case of NO), the procedure goes back to step S11 to repeat the process.

The facsimile apparatus 10 determines whether connection with the facsimile apparatus 30 is established or not (step S15), and if the connection is OK (case of YES), the facsimile apparatus 10 exchanges information with the facsimile apparatus 30 to establish the protocol in preprocessing (step S16). For example, the facsimile apparatus 10 acquires information from the facsimile apparatus 30 such as supported paper sizes (A4, B4, etc.), a compression format, whether G3 and G4 can be supported or not, etc., and performs a process for notifying the facsimile apparatus 30 that the confidential data will be transmitted.

In the preprocessing at the step S16, if the protocol cannot be established by the called facsimile apparatus 30, for example, if the facsimile apparatus 30 does not support the confidential data transmission process of the present invention, an error report may be transmitted to the calling facsimile apparatus 10.

If the connection is NG at step S15 (case of NO), the facsimile apparatus 10 determines whether time-out occurs or not (step S17); if time-out occurs (case of YES), the facsimile apparatus 10 performs a retransmission process; and if time-out does not occur (case of NO), the procedure goes back to step S15 to repeat the process.

If the protocol is established at step S16, the facsimile apparatus 10 reads the document set at the predetermined read position (step S18), performs a data process such as compressing/encoding of the image data of the read document (step S19), and transmits to the facsimile apparatus 30 the encoded data that have been encoded (step S20). The facsimile apparatus 10 determines whether a transmission process for one page is completed or not (step S21), and if the transmission process for one page is completed (case of YES), the facsimile apparatus 10 adds and transmits the confidential data (step S22). If the transmission process for one page is not completed (case of NO), the procedure goes back to step S18 to repeat the process.

The facsimile apparatus 10 determines whether the next document exists or not (step S23); if the next document exists (case of YES), the procedure goes back to step S18 to repeat the process; and if the next document does not exist (case of NO), the procedure is just terminated.

Figure 7:
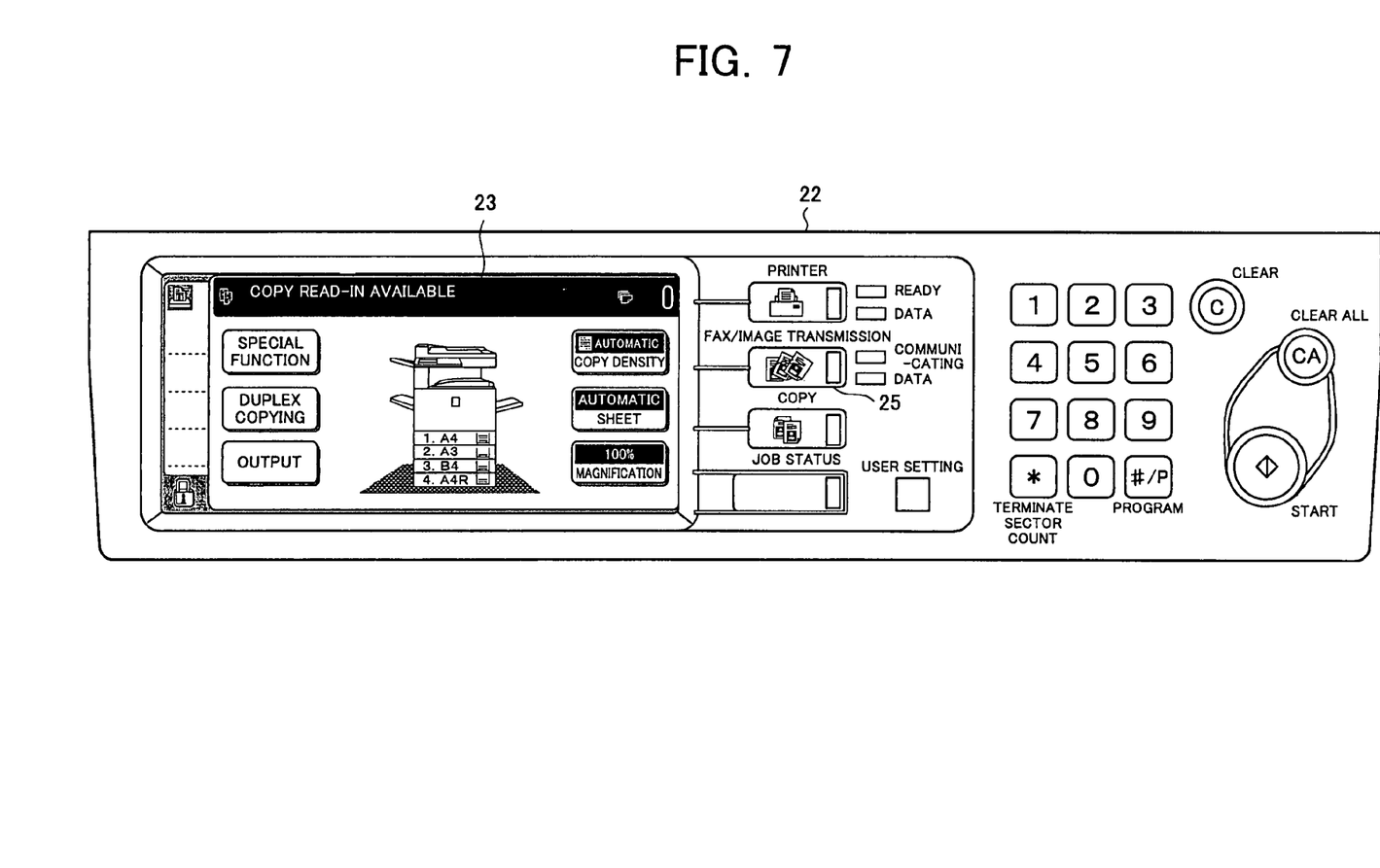
FIG. 7 shows an example of an operation panel constituted by an operating unit and a displaying unit.

FIG. 7 shows an example of an operation panel constituted by the operating unit 22 and the displaying unit 23. The facsimile apparatus 10 includes the operation panel constituted by the operating unit 22 and the displaying unit 23, and the user can perform various selections and settings from this operation panel. The displaying unit 23 of the operation panel is constituted by LCD, etc. with a touch-panel function, and the operating unit 22 is constituted by select buttons for each data processing item such as printer, fax/image transmission, copy, etc., numeric key buttons, a start button, a clear button, etc. When the user performs the facsimile transmission, the user presses a fax/image transmission button 25 and the displaying unit 23 displays a confidential transmission selection screen shown in FIG. 8 below.

FIG. 8 shows an example of the confidential transmission selection screen displayed on the displaying unit 23. When pressing the fax/image transmission button 25 shown in FIG. 7, this confidential transmission selection screen is displayed on the displaying unit 23, and the user presses a confidential button 26 if the confidential transmission is performed.

Figure 9:
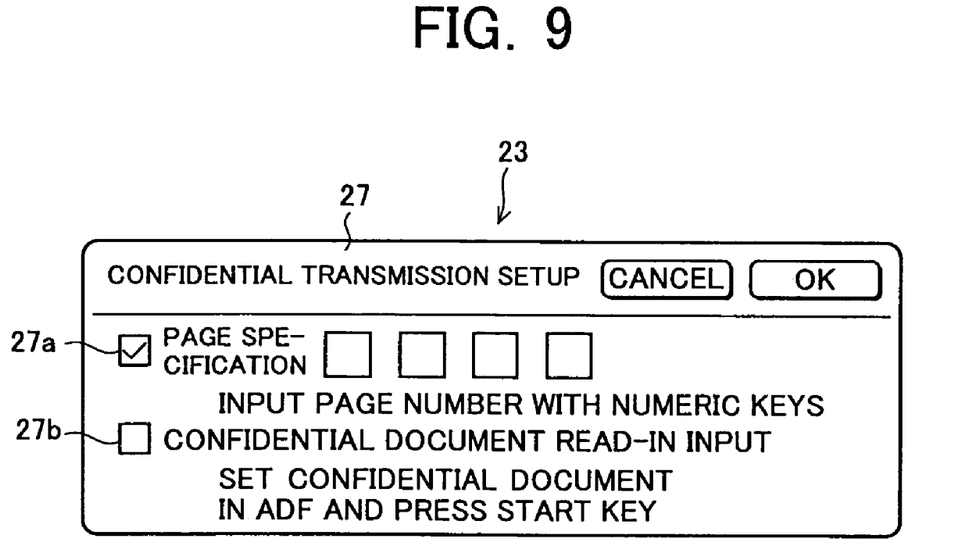
FIG. 9 shows an example of a confidential transmission setup screen displayed on the displaying unit.

FIG. 9 shows an example of a confidential transmission setup screen displayed on the displaying unit 23, and in FIG. 9, a numeral 27 is a confidential transmission setup screen. When pressing the confidential button 26 shown in FIG. 8, this confidential transmission setup screen 27 is displayed on the displaying unit 23, and the confidential transmission setup screen 27 displays a page specification 27a for setting the number of pages of the confidential data and a confidential document read-in input 27b for setting whether the confidential document will be read or not. The user can check the check box of each item of the page specification 27a and the confidential document read-in input 27b to perform setup.

Figure 10:
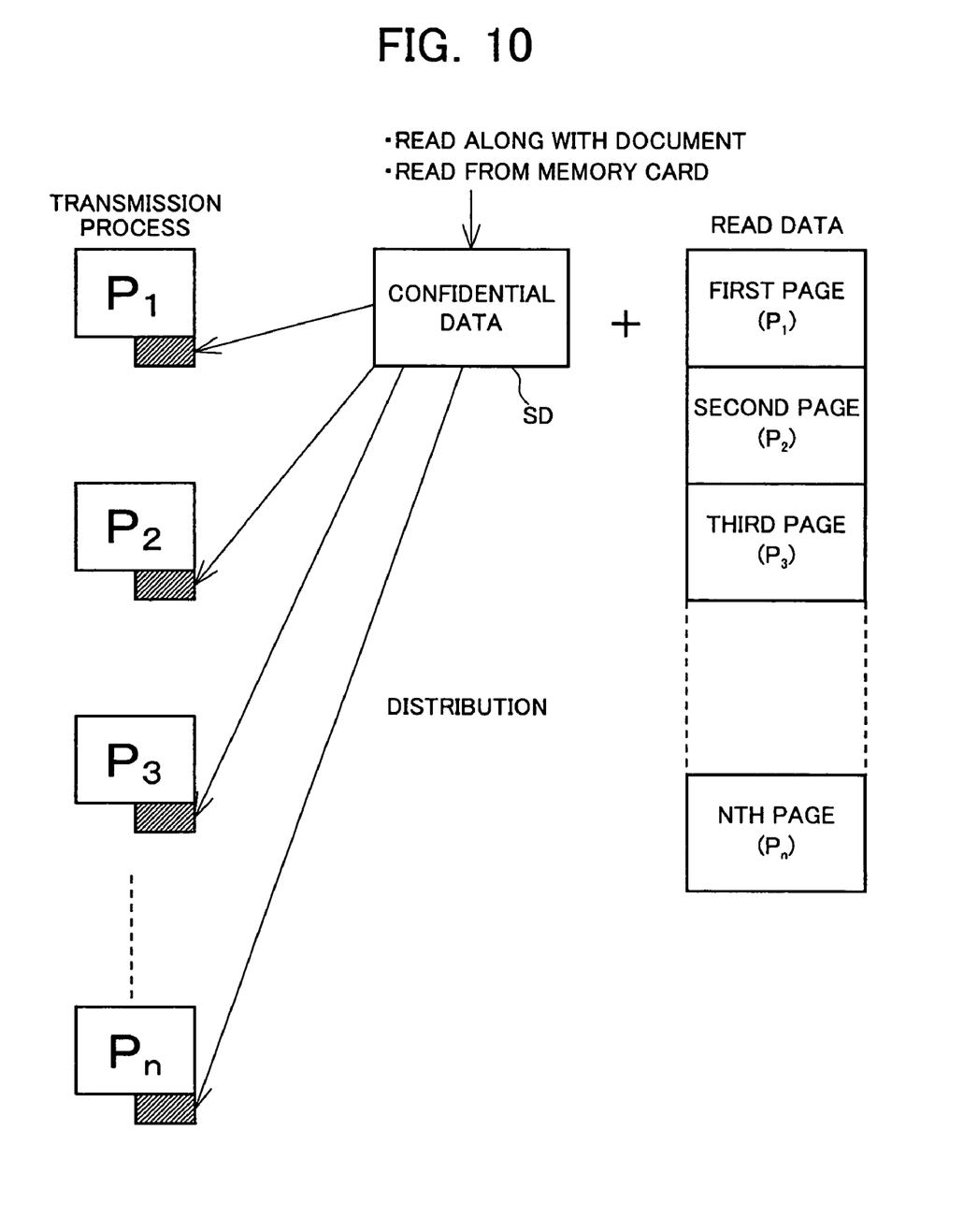
FIG. 10 schematically shows a configuration example of the encoded data of a plurality of pages shown in FIG. 4.

FIG. 10 schematically shows a configuration example of the encoded data of a plurality of pages shown in FIG. 4. As described in FIG. 4, in this example, the confidential data SD are divided into a plurality of portions. The encoded data (the read image data) for adding the confidential data SD are constituted by a plurality of pages $P_1$ to $P_n$. The facsimile apparatus 10 sequentially adds and transmits each portion of the divided confidential data SD after RTC added to each page of the image data $P_1$ to $P_n$. That is, the beginning portion of the confidential data SD is added to and transmitted with the image data $P_1$ for the first page and, similarly, the end portion of the confidential data SD is added to and transmitted with the image data $P_n$ for the Nth page.

Figure 11:
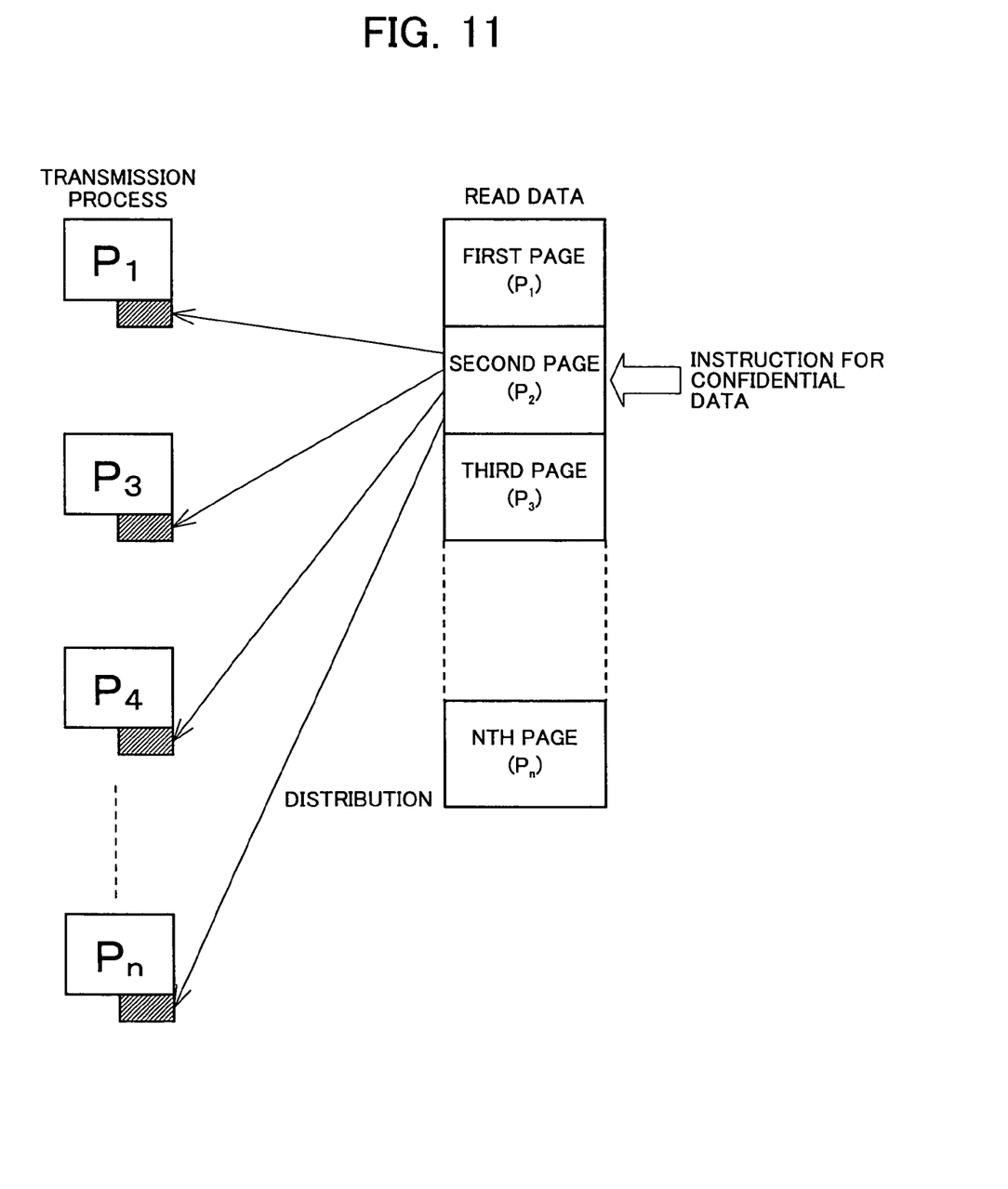
FIG. 11 schematically shows another configuration example of the encoded data of a plurality of pages shown in FIG. 4.

FIG. 11 schematically shows another configuration example of the encoded data of a plurality of pages shown in FIG. 4. The confidential data of this example is any one page (second page in this example) of the encoded data (the read image data), which is divided into a plurality of portions, and the image data originally included in the document are specified to be confidential. The page specified to be confidential is determined in accordance with the instruction of the user.

In FIG. 11, the image data $P_2$ for the second page are specified as the confidential data, and the encoded data (the read image data) for adding this confidential data $P_2$ are constituted by a plurality of pages $P_1$ to $P_n$. The facsimile apparatus 10 sequentially adds and transmits each portion of the divided confidential data $P_2$ after RTC added to each page of the image data $P_1$, $P_3$ to $P_n$. That is, the beginning portion of the confidential data $P_2$ is added to and transmitted with the image data $P_1$ for the first page; the next portion of the confidential data $P_2$ is added to and transmitted with the image data $P_3$ for the third page; and similarly, the end portion of the confidential data $P_2$ is added to and transmitted with the image data $P_n$ for the Nth page.

Although each embodiment of the present invention has been described above, the present invention is not limited to the above embodiments and it will be understood by those who skilled in the art that various modifications can be made within the scope of the present invention described in claims. Although the image forming apparatus is used as a name in the embodiments, this is for convenience of description, and of course, the name may be a facsimile apparatus, digital composite machine, etc.

According to the present invention, the following advantages can be obtained.

According to the present invention, by setting a protocol between the image forming apparatuses so as to add and transmit/receive data that should be confidential at the end of one page of the image data, the confidential communication can be performed only between certain caller and callee establishing this protocol and, therefore, the confidential communication can be performed with a simpler configuration without disposing special equipment on the image forming apparatuses.

The invention claimed is:

1. An image forming apparatus with a function of performing facsimile transmission comprising:
    an encoding unit that encodes input image data;
    a facsimile transmitting unit that performs facsimile transmission for each page of the encoded data that has been encoded; and
    a confidential data acquiring unit that acquires confidential data, which are data that should be confidential between a transmitting image forming apparatus and an other image forming apparatus of a communication partner,
    wherein when the facsimile transmission of the encoded data is performed for each page of the encoded data, the confidential data are added and transmitted at the end of said each page.

2. The image forming apparatus of claim 1, wherein the other image forming apparatus of the communication partner is notified that the confidential data are added and transmitted at the end of the page and wherein performance of the facsimile transmission is started after notification of transmission permission is received from the other image forming apparatus.

3. The image forming apparatus of claim 1, wherein at least one page of the facsimile transmission includes encoded data and the confidential data.

4. The image forming apparatus of claim 1, wherein the facsimile transmission of the encoded data comprises a plurality of pages and is performed such that the confidential data are added at the end of one of said plurality of pages and transmitted before a successive one of the plurality of pages is processed for facsimile transmission.

5. The image forming apparatus of claim 1, wherein the confidential data are added and transmitted at the end of said each page until all of the confidential data is transmitted.

6. An image forming apparatus with a function of performing facsimile transmission comprising:
    an encoding unit that encodes input image data;
    a facsimile transmitting unit that performs facsimile transmission for each page of the encoded data that has been encoded;
    a confidential data acquiring unit that acquires confidential data, which are data that should be confidential between a communication partner;
    wherein when the facsimile transmission of the encoded data is performed for each page of the encoded data, the confidential data are added and transmitted at the end of said each page; and
    wherein one page of the encoded data is constituted by a plurality of lines and wherein the facsimile transmitting unit performs facsimile transmission (a) by adding an end code indicating the end of the page after the final line of the one page of the encoded data and (b) by adding the confidential data to the said one page of encoded data after the end code.

7. The image forming apparatus of claim 6, wherein the confidential data are any one page of the encoded data, which is divided into a plurality of portions, and wherein the facsimile transmission is performed by adding each portion of the confidential data sequentially to the end of each page of the encoded data after the end code added respectively to said each page of the encoded data.

8. The image forming apparatus of claim 6, wherein the confidential data are divided into a plurality of portions and wherein the facsimile transmission is performed by adding each portion of the confidential data sequentially to the end of said each page of the encoded data after the end code added respectively to said each page of the encoded data.

9. The image forming apparatus of claim 6, wherein the confidential data are encrypted and divided into a plurality of portions and wherein the facsimile transmission is performed by including an encryption key for decrypting the confidential data in any page when adding and transmitting each portion of the confidential data sequentially to the end of each page of the encoded data after the end code added respectively to said each page of the encoded data.

10. The image forming apparatus of any one of claims 8 to 9, wherein the each page of the encoded data is data by encoding different image data.

11. The image forming apparatus of any one of claims 8 to 9, wherein the each page of the encoded data is data by dividing one piece of image data into a plurality of data and encoding the data.

12. The image forming apparatus of any one of claims 8 to 9, wherein at least one page of the each page of the encoded data is dummy data.

13. A confidential data transmitting method of an image forming apparatus with a function of performing facsimile transmission comprising the steps of:
   encoding inputted image data;
   acquiring confidential data, which are data that should be confidential between a transmitting image forming apparatus and a communication partner;
   performing facsimile transmission of each page of encoded data that are the encoded image data; and
   wherein said performing facsimile transmission further includes, for at least one of said each page, adding and transmitting the confidential data at the end of said each page.

14. The confidential data transmitting method of claim 13, wherein at least one page being facsimile transmitted includes encoded data and the confidential data.

15. A confidential data transmitting method of an image forming apparatus with a function of performing facsimile transmission comprising the steps of:
   encoding input inputted image data;
   acquiring confidential data, which are data that should be confidential between a transmitting image forming apparatus and an other image forming apparatus of a communication partner;
   wherein when the facsimile transmission of the encoded is being performed for each page of encoded data that are the encoded image data, adding and transmitting the confidential data at the end of the said each page; and
   wherein the other image forming apparatus of the communication partner is notified that the confidential data are added and transmitted at the end of the page and wherein the facsimile transmission of the encoded data and the confidential data is started after notification of transmission permission is received from the other image forming apparatus.

16. A confidential data transmitting method of an image forming apparatus with a function of performing facsimile transmission comprising the steps of:
   encoding input inputted image data;
   acquiring confidential data, which are data that should be confidential between a transmitting image forming apparatus and an other image forming apparatus of a communication partner;
   wherein when the facsimile transmission of the encoded is being performed for each page of encoded data that are the encoded image data, adding and transmitting the confidential data at the end of the said each page; and
   wherein one page of the encoded data is constituted by a plurality of lines and wherein the facsimile transmission is performed (a) by adding an end code indicating the end of the page after the final line of the one page of the encoded data and (b) by adding the confidential data to said one page of the encoded data after the end code.

17. A confidential data transmitting method of an image forming apparatus with a function of performing facsimile transmission comprising the steps of:
   encoding input inputted image data;
   acquiring confidential data, which are data that should be confidential between a transmitting image forming apparatus and an other image forming apparatus of a communication partner;
   wherein when the facsimile transmission of the encoded is being performed for each page of encoded data that are the encoded image data, adding and transmitting the confidential data at the end of the said each page; and
   wherein the encoded data comprises a plurality of pages and said performing facsimile transmission includes and performing facsimile transmission includes performing such that the confidential data are added at the end of one of said plurality of pages and transmitted before a successive one of the plurality of pages is processed for facsimile transmission.

* * * * *